United States Patent
Alizadeh-Shabdiz

(10) Patent No.: US 8,223,074 B2
(45) Date of Patent: *Jul. 17, 2012

(54) SYSTEMS AND METHODS FOR USING A SATELLITE POSITIONING SYSTEM TO DETECT MOVED WLAN ACCESS POINTS

(75) Inventor: Farshid Alizadeh-Shabdiz, Wayland, MA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/211,690

(22) Filed: Aug. 17, 2011

(65) Prior Publication Data

US 2011/0298663 A1 Dec. 8, 2011

Related U.S. Application Data

(63) Continuation of application No. 12/504,373, filed on Jul. 16, 2009, now Pat. No. 8,022,877.

(51) Int. Cl.
*G01S 3/02* (2006.01)
(52) U.S. Cl. ....................................... 342/463
(58) Field of Classification Search .............. 342/463
See application file for complete search history.

(56) References Cited

U.S. PATENT DOCUMENTS

| | | | |
|---|---|---|---|
| 4,876,550 A | 10/1989 | Kelly | |
| 5,420,592 A | 5/1995 | Johnson | |
| 5,936,572 A | 8/1999 | Loomis et al. | |
| 5,943,606 A | 8/1999 | Kremm et al. | |
| 5,999,124 A | 12/1999 | Sheynblat | |
| 6,185,427 B1 | 2/2001 | Krasner et al. | |
| 6,272,405 B1 | 8/2001 | Kubota et al. | |
| 6,420,999 B1 | 7/2002 | Vayanos | |
| 6,574,557 B2 | 6/2003 | Endo | |
| 6,587,692 B1 | 7/2003 | Chen et al. | |
| 6,678,611 B2 | 1/2004 | Khavakh et al. | |
| 6,707,422 B2 | 3/2004 | Sheynblat et al. | |
| 6,725,158 B1 | 4/2004 | Sullivan et al. | |
| 6,771,211 B2 | 8/2004 | Syrjarinne et al. | |
| 6,888,811 B2 | 5/2005 | Eaton et al. | |
| 6,894,645 B1 | 5/2005 | Akopian et al. | |
| 6,928,292 B2 | 8/2005 | Tsunehara et al. | |
| 6,975,266 B2 | 12/2005 | Abraham et al. | |
| 6,978,023 B2 | 12/2005 | Dacosta | |

(Continued)

FOREIGN PATENT DOCUMENTS

WO WO-2005/004527 A1 1/2005

(Continued)

OTHER PUBLICATIONS

Griswold, et al., "ActiveCamus—Sustaining Educational Communities through Mobile Technology," UCSD CSE Technical Report #CS200-0714, 2002, 19 pages.

(Continued)

*Primary Examiner* — Harry Liu
(74) *Attorney, Agent, or Firm* — Wilmer Cutler Pickering Hale and Dorr LLP

(57) ABSTRACT

The disclosed subject matter generally relates to hybrid positioning systems and methods and, more specifically, systems and methods of detecting moved WLAN assess points using a wireless local area network based positioning system (WLAN-PS) and a satellite-based positioning system (SPS) with at least two satellites measurement.

24 Claims, 8 Drawing Sheets

U.S. PATENT DOCUMENTS

| | | |
|---|---|---|
| 7,120,449 B1 | 10/2006 | Muhonen et al. |
| 7,123,928 B2 | 10/2006 | Moeglein et al. |
| 7,130,646 B2 | 10/2006 | Wang |
| 7,151,939 B2 | 12/2006 | Sheynblat |
| 7,221,928 B2 | 5/2007 | Laird et al. |
| 7,236,126 B2 | 6/2007 | Jeon et al. |
| 7,250,907 B2 | 7/2007 | Krumm et al. |
| 7,254,405 B2 | 8/2007 | Lin et al. |
| 7,305,245 B2 | 12/2007 | Alizadeh-Shabdiz et al. |
| 7,313,402 B1 | 12/2007 | Rahman |
| 7,397,424 B2 | 7/2008 | Houri |
| 7,403,762 B2 | 7/2008 | Morgan et al. |
| 7,414,988 B2 | 8/2008 | Jones et al. |
| 7,433,694 B2 | 10/2008 | Morgan et al. |
| 7,471,954 B2 | 12/2008 | Brachet et al. |
| 7,474,897 B2 | 1/2009 | Morgan et al. |
| 7,479,922 B2 | 1/2009 | Hunt et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz et al. |
| 7,545,894 B2 | 6/2009 | Ziedan et al. |
| 7,551,579 B2 | 6/2009 | Alizadeh-Shabdiz et al. |
| 7,551,929 B2 | 6/2009 | Alizadeh-Shabdiz et al. |
| 7,587,081 B2 | 9/2009 | Rovira-Mas et al. |
| 7,595,754 B2 | 9/2009 | Mehta |
| 7,660,588 B2 | 2/2010 | Sheynblat et al. |
| 7,664,511 B2 | 2/2010 | Wang et al. |
| 7,683,835 B2 | 3/2010 | Sharma |
| 7,724,612 B2 | 5/2010 | Azim |
| 7,768,963 B2 | 8/2010 | Alizadeh-Shabdiz |
| 7,769,396 B2 | 8/2010 | Alizadeh-Shabdiz et al. |
| 7,818,017 B2 | 10/2010 | Alizadeh-Shabdiz et al. |
| 7,822,427 B1 | 10/2010 | Hou |
| 7,835,754 B2 | 11/2010 | Alizadeh-Shabdiz et al. |
| 7,848,733 B2 | 12/2010 | Bull et al. |
| 7,856,234 B2 | 12/2010 | Alizadeh-Shabdiz et al. |
| 7,916,661 B2 | 3/2011 | Alizadeh-Shabdiz et al. |
| 7,999,742 B2 | 8/2011 | Alizadeh-Shabdiz |
| 8,014,788 B2 | 9/2011 | Alizadeh-Shabdiz et al. |
| 8,019,357 B2 | 9/2011 | Alizadeh-Shabdiz et al. |
| 8,022,877 B2 | 9/2011 | Alizadeh-Shabdiz |
| 8,054,219 B2 | 11/2011 | Alizadeh-Shabdiz |
| 8,063,820 B2 | 11/2011 | Alizadeh-Shabdiz |
| 8,090,386 B2 | 1/2012 | Alizadeh-Shabdiz et al. |
| 8,103,288 B2 | 1/2012 | Alizadeh-Shabdiz et al. |
| 8,130,148 B2 | 3/2012 | Alizadeh-Shabdiz |
| 8,154,454 B2 | 4/2012 | Alizadeh-Shabdiz |
| 8,155,673 B2 | 4/2012 | Alizadeh-Shabdiz et al. |
| 2003/0011511 A1 | 1/2003 | King et al. |
| 2003/0125045 A1 | 7/2003 | Riley et al. |
| 2003/0197645 A1 | 10/2003 | Ninomiya et al. |
| 2003/0225893 A1 | 12/2003 | Roese et al. |
| 2004/0019679 A1 | 1/2004 | E et al. |
| 2004/0023669 A1 | 2/2004 | Reddy |
| 2004/0039520 A1 | 2/2004 | Khavakh et al. |
| 2004/0087317 A1 | 5/2004 | Caci |
| 2005/0017898 A1 | 1/2005 | Teranishi |
| 2005/0037775 A1 | 2/2005 | Moeglein et al. |
| 2005/0090266 A1 | 4/2005 | Sheynblat |
| 2005/0192024 A1 | 9/2005 | Sheynblat |
| 2005/0237967 A1 | 10/2005 | Lee et al. |
| 2005/0285783 A1 | 12/2005 | Harper |
| 2006/0009235 A1 | 1/2006 | Sheynblat et al. |
| 2006/0046709 A1 | 3/2006 | Krumm et al. |
| 2006/0049982 A1 | 3/2006 | Wells |
| 2006/0063560 A1 | 3/2006 | Herle |
| 2006/0089157 A1 | 4/2006 | Casey et al. |
| 2006/0089160 A1 | 4/2006 | Othmer |
| 2006/0170591 A1 | 8/2006 | Houri |
| 2006/0197704 A1 | 9/2006 | Luzzatto et al. |
| 2007/0004428 A1 | 1/2007 | Morgan et al. |
| 2007/0052583 A1 | 3/2007 | Zhodzishsky et al. |
| 2007/0109184 A1 | 5/2007 | Shyr et al. |
| 2007/0121560 A1 | 5/2007 | Edge |
| 2007/0126635 A1 | 6/2007 | Houri |
| 2007/0150516 A1 | 6/2007 | Morgan et al. |
| 2007/0167174 A1 | 7/2007 | Halcrow et al. |
| 2007/0216540 A1 | 9/2007 | Riley et al. |
| 2007/0217374 A1 | 9/2007 | Waxman |
| 2007/0244631 A1 | 10/2007 | Jung et al. |
| 2007/0268177 A1 | 11/2007 | Ahmed et al. |
| 2007/0286213 A1 | 12/2007 | Fodor et al. |
| 2007/0298761 A1 | 12/2007 | Bani Hani |
| 2008/0004888 A1 | 1/2008 | Davis et al. |
| 2008/0008117 A1 | 1/2008 | Alizadeh-Shabdiz |
| 2008/0008118 A1 | 1/2008 | Alizadeh-Shabdiz |
| 2008/0008119 A1 | 1/2008 | Alizadeh-Shabdiz |
| 2008/0008121 A1 | 1/2008 | Alizadeh-Shabdiz |
| 2008/0032706 A1 | 2/2008 | Sheynblat et al. |
| 2008/0033646 A1 | 2/2008 | Morgan et al. |
| 2008/0079633 A1 | 4/2008 | Pon et al. |
| 2008/0111737 A1 | 5/2008 | Haverkamp et al. |
| 2008/0137626 A1 | 6/2008 | Choi et al. |
| 2008/0158053 A1 | 7/2008 | Watanabe |
| 2008/0176583 A1 | 7/2008 | Brachet et al. |
| 2008/0214192 A1 | 9/2008 | Soliman |
| 2008/0234533 A1 | 9/2008 | Vollum |
| 2008/0248741 A1 | 10/2008 | Alizadeh-Shabdiz |
| 2008/0248808 A1 | 10/2008 | Alizadeh-Shabdiz |
| 2008/0261615 A1 | 10/2008 | Kalhan |
| 2009/0002237 A1 | 1/2009 | Nonoyama |
| 2009/0042557 A1* | 2/2009 | Vardi et al. ............ 455/422.1 |
| 2009/0075672 A1 | 3/2009 | Jones et al. |
| 2009/0103503 A1 | 4/2009 | Chhabra |
| 2009/0121927 A1 | 5/2009 | Moshfeghi |
| 2009/0149197 A1 | 6/2009 | Morgan et al. |
| 2009/0161806 A1 | 6/2009 | Ananny et al. |
| 2009/0168843 A1 | 7/2009 | Waters et al. |
| 2009/0175189 A1 | 7/2009 | Alizadeh-Shabdiz et al. |
| 2009/0181695 A1 | 7/2009 | Wirola et al. |
| 2009/0187983 A1 | 7/2009 | Zerfos et al. |
| 2009/0189810 A1 | 7/2009 | Murray |
| 2009/0192709 A1 | 7/2009 | Yonker et al. |
| 2009/0196267 A1 | 8/2009 | Walker, Sr. |
| 2009/0231191 A1 | 9/2009 | Wu et al. |
| 2009/0251364 A1 | 10/2009 | Lorenz |
| 2009/0303112 A1 | 12/2009 | Alizadeh-Shabdiz |
| 2009/0303113 A1 | 12/2009 | Alizadeh-Shabdiz |
| 2009/0303114 A1 | 12/2009 | Alizadeh-Shabdiz |
| 2009/0303115 A1 | 12/2009 | Alizadeh-Shabdiz |
| 2009/0303119 A1 | 12/2009 | Alizadeh-Shabdiz |
| 2009/0310585 A1 | 12/2009 | Alizadeh-Shabdiz |
| 2009/0312035 A1 | 12/2009 | Alizadeh-Shabdiz |
| 2009/0312036 A1 | 12/2009 | Alizadeh-Shabdiz |
| 2010/0039323 A1* | 2/2010 | Kosolobov et al. ...... 342/357.13 |
| 2010/0052983 A1 | 3/2010 | Alizadeh-Shabdiz |
| 2010/0195632 A1 | 8/2010 | Prabhu |
| 2010/0309051 A1 | 12/2010 | Moshfeghi |
| 2011/0021207 A1 | 1/2011 | Morgan et al. |
| 2011/0035420 A1 | 2/2011 | Alizadeh-Shabdiz et al. |
| 2011/0045840 A1 | 2/2011 | Alizadeh-Shabdiz et al. |
| 2011/0074626 A1 | 3/2011 | Alizadeh-Shabdiz et al. |
| 2011/0080317 A1 | 4/2011 | Alizadeh-Shabdiz et al. |
| 2011/0080318 A1 | 4/2011 | Alizadeh-Shabdiz et al. |
| 2011/0164522 A1 | 7/2011 | Alizadeh-Shabdiz et al. |
| 2011/0235532 A1 | 9/2011 | Alizadeh-Shabdiz et al. |
| 2011/0235623 A1 | 9/2011 | Alizadeh-Shabdiz et al. |
| 2011/0287783 A1 | 11/2011 | Alizadeh-Shabdiz et al. |
| 2011/0298660 A1 | 12/2011 | Alizadeh-Shabdiz |
| 2011/0298663 A1 | 12/2011 | Alizadeh-Shabdiz |
| 2011/0298664 A1 | 12/2011 | Alizadeh-Shabdiz |
| 2011/0306357 A1 | 12/2011 | Alizadeh-Shabdiz et al. |
| 2011/0306358 A1 | 12/2011 | Alizadeh-Shabdiz et al. |
| 2011/0306359 A1 | 12/2011 | Alizadeh-Shabdiz et al. |
| 2011/0306360 A1 | 12/2011 | Alizadeh-Shabdiz et al. |
| 2011/0306361 A1 | 12/2011 | Alizadeh-Shabdiz et al. |

FOREIGN PATENT DOCUMENTS

| | | |
|---|---|---|
| WO | WO-2008/006077 A2 | 1/2008 |
| WO | WO-2008/008613 | 1/2008 |
| WO | WO-2009/149417 | 12/2009 |
| WO | WO-2010/005731 | 1/2010 |
| WO | WO-2011/008613 | 1/2011 |
| WO | WO-2011/041430 | 1/2011 |
| WO | WO-2011/041298 | 4/2011 |

OTHER PUBLICATIONS

Hazas, M., et al., "Location-Aware Computing Comes of Age," IEEE, vol. 37, Feb. 2004, 3 pages.

Hellebrandt, M. et al., "Estimating Position and Velocity of Mobile in a Cellular Radio Network," IEEE Transactions on Vehicular Technology, vol. 46, No. 1, Feb. 1997, 7 pages.

International Search Report and Written Opinion of the International Search Authority, The United States Patent and Trademark Office, for International Application No. PCT/US2011/059139, dated Jan. 31, 2012, 12 pages.

International Search Report and Written Opinion of the International Searching Authority for PCT/US2009/046504, mailed Oct. 7, 2009, 12 pages.

International Search Report and Written Opinion of the International Searching Authority of the United States Patent and Trademark Office for PCT/US2010/041282, mailing date of Aug. 30, 2010, 8 pages.

International Search Report and Written Opinion of the International Searching Authority, mailing date Aug. 18, 2009 for PCT/US09/047527, 10 pages.

International Search Report and Written Opinion of the International Searching Authority, the United States Patent and Trademark Office, for International Application No. PCT/US2010/050511, dated Dec. 30, 2010, 8 pages.

International Search Report and Written Opinion of the International Searching Authority, the United States Patent and Trademark Office, for International Application No. PCT/US2010/050742, dated Dec. 3, 2010, 9 pages.

Kim, M. et al., "Risks of Using AP Locations Discovered Through War Driving," Lecture Notes in Computer Science, vol. 3968, 2006, 15 pages.

Kirsner, S., "One More Way to Find Yourself," The Boston Globe, May 23, 2005, Retrieved from www.boston.com, 2 pages.

Krumm, J. et al., "LOCADIO: Interferring Motion and Location from Wi-Fi Signal Strengths," First Annual International Conference and Mobile and Ubiquitous Systems: Networking and Services, Aug. 2004, 17 pages.

LaMarca, A. et al., "Place Lab: Device Positioning Using Radio Beacons in the Wild," Intel Corporation, 2004, 20 pages.

Muthukrishnan, K. et al., "Towards Smart Surroundings: Enabling Techniques and Technologies for Localization," Lecture Notes in Computer Science, vol. 3479, May 2005, 11 pages.

Wikipedia, "Dilution of Precision (GPS)," May 2009, 3 pages, http://web.archive.org/web/20090516014557/http://en.wikipedia.org/wiki/Dilution_of_pre...Jul. 28, 2011.

* cited by examiner

SYSTEMS AND METHODS FOR USING A SATELLITE POSITIONING SYSTEM TO DETECT MOVED WLAN ACCESS POINTS

CROSS-REFERENCE TO RELATED APPLICATIONS

This application is a continuation of U.S. patent application Ser. No. 12/504,373, filed Jul. 16, 2009, and entitled "Systems and Methods for Using a Satellite Positioning System to Detect Moved WLAN Access Points", now U.S. Pat. No. 8,022,877, incorporated by reference herein.

This application is related to the following U.S. patent applications:

U.S. patent application Ser. No. 13/211,696, filed Aug. 17, 2011, and entitled "Systems and Methods for Using a Satellite Positioning System to Detect Moved WLAN Access Points";

U.S. patent application Ser. No. 13/211,703, filed Aug. 17, 2011, and entitled "Systems and Methods for Using a Satellite Positioning System to Detect Moved WLAN Access Points"; and U.S. patent application Ser. No. 13/211,711, filed Aug. 17, 2011, and entitled "Systems and Methods for Using a Satellite Positioning System to Detect Moved WLAN Access Points".

BACKGROUND

1. Field

The disclosed subject matter generally relates to hybrid positioning systems and, more specifically, to detecting movement of WiFi access points using information from two or more satellites in an integrated wireless local area network based positioning system (WLAN-PS) and satellite-based positioning system (SPS).

2. Description of Related Art

In recent years the number of mobile computing devices has increased dramatically, creating the need for more advanced mobile and wireless services. Mobile email, walkie-talkie services, multi-player gaming and call-following are examples of how new applications are emerging for mobile devices. In addition, users are beginning to demand/seek applications that not only utilize their current location but also share that location information with others. Parents wish to keep track of their children, supervisors need to track the locations of the company's delivery vehicles, and a business traveler looks to find the nearest pharmacy to pick up a prescription. All of these examples require an individual to know his own current location or the location of someone else. To date, we all rely on asking for directions, calling someone to ask their whereabouts or having workers check-in from time to time to report their positions.

Location-based services are an emerging area of mobile applications that leverage the ability of new devices to calculate their current geographic positions and report them to a user or to a service. Examples of these services range from obtaining local weather, traffic updates and driving directions to child trackers, buddy finders and urban concierge services. These new location-sensitive devices rely on a variety of technologies that all use the same general concept. By measuring radio signals originating from known reference points, these devices can mathematically calculate the user's position relative to these reference points. Each of these approaches has its strengths and weaknesses depending upon the nature of the signals and measurements, and the positioning algorithms employed.

The Naystar Global Positioning System (GPS) operated by the US Government leverages about two-dozen orbiting satellites in medium-earth orbits as reference points. A user equipped with a GPS receiver can estimate his three-dimensional position (latitude, longitude, and altitude) anywhere at any time within several meters of the true location as long as the receiver can see enough of the sky to have four or more satellites "in view." Cellular carriers have used signals originating from and received at cell towers to determine a user's or a mobile device's location. Assisted GPS (AGPS) is another model that combines both GPS and cellular tower techniques to estimate the locations of mobile users who may be indoors and must cope with attenuation of GPS signals on account of sky blockage. In this model, the cellular network attempts to help a GPS receiver improve its signal reception by transmitting information about the satellite positions, their clock offsets, a precise estimate of the current time, and a rough location of the user based on the location of cell towers. No distinction is made in what follows between GPS and AGPS.

All positioning systems using satellites as reference points are referred to herein as Satellite-based Positioning System (SPS). While GPS is the only operational SPS at this writing, other systems are under development or in planning. A Russian system called GLONASS and a European system called Galileo may become operational in the next few years. All such systems are referred to herein as SPS. GPS, GLONASS and Galileo are all based on the same basic idea of trilateration, i.e., estimating a position on the basis of measurements of ranges to the satellites whose positions are known. In each case, the satellites transmit the values of certain parameters which allow the receiver to compute the satellite position at a specific instant. The ranges to satellites from a receiver are measured in terms of the transit times of the signals. These range measurements can contain a common bias due to the lack of synchronization between the satellite and receiver (user device) clocks, and are referred to as pseudoranges. The lack of synchronization between the satellite clock and the receiver (user device) clock can result in a difference between the receiver clock and the satellite clock, which is referred to as internal SPS receiver clock bias or receiver clock bias, here. In order to estimate a three dimensional position there is a need for four satellites to estimate receiver clock bias along with three dimensional measurements. Additional measurements from each satellite correspond to pseudorange rates in the form of Doppler frequency. References below to raw SPS measurements are intended generally to mean pseudoranges and Doppler frequency measurements. References to SPS data are intended generally to mean data broadcast by the satellites. References to an SPS equation are intended to mean a mathematical equation relating the measurements and data from a satellite to the position and velocity of an SPS receiver.

WLAN-based positioning is a technology which uses WLAN access points to determine the location of mobile users. Metro-wide WLAN-based positioning systems have been explored by several research labs. The most important research efforts in this area have been conducted by the PlaceLab (www.placelab.com, a project sponsored by Microsoft and Intel); the University of California, San Diego ActiveCampus project (ActiveCampus—Sustaining Educational Communities through Mobile Technology, technical report #CS2002-0714); and the MIT campus-wide location system. There is only one commercial metropolitan WLAN-based positioning system in the market at the time of this writing, and it is referred to herein as the WPS (WiFi positioning system) product of Skyhook Wireless, Inc (www.skyhookwireless.com).

FIG. 1 depicts a conventional WLAN-based positioning system based on WiFi signals. The positioning system includes positioning software 103 that resides on a mobile or user device 101. Throughout a particular target geographical area, there are a plurality of fixed wireless access points 102 that transmit information using control/common channel signals. The device 101 monitors these transmissions. Each access point contains a unique hardware identifier known as a MAC address. The client positioning software 103 receives transmissions from the 802.11 access points in its range and calculates the geographic location of the computing device using the characteristics of the radio signals. Those characteristics include the MAC addresses, the unique identifiers of the 802.11 access points, the Time of Arrival (TOA) of the signals, and the signal strength at the client device 101. The client software 103 compares the observed 802.11 access points with those in its reference database 104 of access points. This reference database 104 may or may not reside in the device 101. The reference database 104 contains the calculated geographic locations and power profiles of all access points the system has collected. A power profile may be generated from a collection of measurements of the signal power or signal TOA at various locations. Using these known locations or power profiles, the client software 103 calculates the position of the user device 101 relative to the known positions of the access points 102 and determines the device's 101 absolute geographic coordinates in the form of latitude and longitude or latitude, longitude and altitude. These readings then can be fed to location-based applications such as friend finders, local search web sites, fleet management systems, and an E911 service.

In the discussion herein, raw WLAN measurements from an access point are generally intended to mean received signal strength (RSS) and/or times of arrival (TOAs) and/or time differences of arrival (TDOAs). References to data are generally intended to mean the MAC address, one or more record(s) of it, one or more power profile(s), and other attributes based on previous measurements of that access point. References to a WLAN-PS equation are intended to mean a mathematical equation relating the WLAN-PS measurements and data to the location of the mobile device.

A WLAN-based positioning system can be used indoors or outdoors. The only requirement is presence of WLAN access points in the vicinity of the user. The WLAN-based position systems can be leveraged using existing off-the-shelf WLAN cards without any modification other than to employ logic to estimate position.

FIG. 2 illustrates a conventional way of integrating WLAN-PS and SPS, which consists of a WLAN-PS 201 and a SPS 206, and a location combining logic 210.

WLAN-PS 201 and SPS 206 are stand-alone systems and each can operate independently of the other system. Thus, the result of each system can be calculated independent of the other system. The estimated location along with the expected error estimation of each system can be fed to the location combining logic 210. The expected error estimation also is referred to as HPE (horizontal positioning error) herein. The nominal rate of location update of SPS 206 and WLAN-PS 201 is once per second. The location combining logic 210 combines location estimates calculated in the same second by both systems.

WLAN-PS 201 is a conventional system which estimates the location of a mobile device by using WLAN access points. WLAN-PS 201 can include a scanner of WLAN APs 202, a select WLAN APs device 203, a trilateration device 204, and HPE estimation device 205.

WLAN Scanner 202 detects WLAN APs surrounding the mobile device by detecting the received power (RSS, received signal strength) and/or time of arrival (TOA) of the signal. Different methods can be used to detect WLAN APs including active scanning, passive scanning or combination of passive and active scanning.

The select WLAN APs device 203 selects the best set of WLAN APs to estimate the location of the mobile device. For example, if ten WLAN APs are detected and one AP is located in Chicago and the other nine are located in Boston, without any other information, the Boston APs are selected. This is an indication that Chicago AP has been moved to Boston. Please see U.S. patent application Ser. No. 11/359,154 as filed Feb. 22, 2006 and entitled "Continuous Data Optimization of Moved Access Points in Positioning Systems," the entire contents of which are hereby incorporated by reference. In the conventional system the best set of WLAN APs can be selected based on geographical distribution of WLAN APs in addition to corresponding parameters of WLAN APs, including received signal strength, signal to noise ratio, and the probability of being moved.

The trilateration device 204 can use WLAN APs and their corresponding measurements and characteristics to estimate the location of the mobile device. Received signal strength or TOA measurements from the WLAN AP can be used to estimate the distance of the mobile device to the WLAN AP. The aggregation of distance estimates from different WLAN APs with known location of the APs can be used to calculate location of the mobile device. Trilateration device 204 also can use a method which is called nearest neighbor, in which a location with a power profile similar or closest to the power reading of the mobile device is reported as the final location of the mobile device. The power profile of each WLAN AP or entire coverage area can be found in the calibration phase of the system by detailed survey of the coverage area.

HPE estimation device 205 is the module which estimates the expected error of the position estimate of the mobile device. The HPE or Horizontal Positioning Error is calculated based on previously scanned APs and their characteristics and also on characteristics of the received signal as was discussed in co-pending Skyhook Wireless application Ser. No. 11/625,450 entitled "System and Method for Estimating Positioning Error Within a WLAN Based Positioning System," the entire disclosure of which is hereby incorporated by reference.

The SPS system 206 consists of a satellite signal receiver and measurement device 207, trilateration device 208, and the SPS HPE estimation device 209.

The satellite signal receiver and measurement device 207 receives signals from the satellites in view of the device, decodes the received signal, and measures the satellite parameters from each satellite. The measurements can include pseudorange, carrier frequency, and Doppler frequency.

The trilateration device 208 uses measurements from at least four satellites and location of the satellites in view to estimate location of the user device, velocity, and direction of travel of the mobile device.

HPE estimation device 209 estimates the expected error of the estimated location. The HPE estimation device 209 is conventional and calculates expected error based on geometry of the satellites and signal quality of the received signal from satellites, for example, DOP (dilution of precision), and C/N (carrier to noise ratio).

Location combining logic 210 receives location and HPE estimates calculated for almost the same second from WLAN-PS 201 and SPS 206. In other words, measurements and estimations which are made at the same time are compared and combined. Practically, measurements and estimations within one second can be considered the same time. The location combining logic 210 of the user device reports one estimated location by selecting one of them or linearly combining them. For example, location combining logic might select one of the estimated locations provided by WLAN-PS 201 or SPS 206 based on reported expected error, HPE, or it might report weighted average of estimated locations by both systems according to the HPE.

SUMMARY

The disclosed subject matter generally relates to hybrid positioning systems and methods and, more specifically, systems and methods for detecting moved WLAN assess points using a wireless local area network based positioning system (WLAN-PS) and a satellite-based positioning system (SPS) with at least two satellites measurement.

In one aspect the disclosed subject matter relates to a method of using a WLAN and satellite enabled device to detect WLAN access points (APs) that have moved, the method can include, detecting WLAN APs in range of the WLAN and satellite enabled device, accessing a reference database to obtain a reference location of each WLAN AP, obtaining satellite measurements from at least two satellites to provide a plurality of possible SPS location solutions of the device, calculating a distance between each reference WLAN AP location and the possible SPS location solutions, and if the distance between the reference WLAN AP location and the SPS location solutions is far, determining that the WLAN AP location and/or other associated data to the WLAN AP in the reference database is not correct.

In some embodiments, the method can include notifying the reference database that the WLAN AP location is not correct.

In some embodiments, the method can include updating the reference database's location for the WLAN AP.

In some embodiments, the possible SPS location solutions of the device can include a region of possible location solutions for the device.

In some embodiments, the reference WLAN AP location is far from the SPS locations solutions if the distance is an order of magnitude above the coverage area of the AP.

In some embodiments, the method can include measuring a consistency between the satellite measurements and the WLAN AP reference location.

In some embodiments, the WLAN AP reference location consistency with the satellite information can be measured by applying each of the WLAN AP reference locations to the satellite measurements and calculating an internal SPS receiver clock bias for each WLAN AP reference location.

In some embodiments, a consistency of the internal SPS receiver clock bias for each of the WLAN AP locations can be used as an indication of distance between the WLAN AP location and the possible SPS location solutions of the device.

In some embodiments, calculating the consistency of the internal SPS receiver clock bias for each WLAN AP reference location can include calculating the standard deviation or the mean square error of the internal SPS receiver clock bias.

In some embodiments, the method includes calculating an internal SPS receiver clock bias by considering the WLAN AP reference location as an initial position.

In one aspect the disclosed subject matter relates to a system for determining the location of a WLAN and satellite enabled device to detect moved WLAN access points (APs) can include a hybrid positioning module, a WLAN module for receiving information from one or more WLAN access points, a satellite positioning module for providing a plurality of possible device locations of the device based on satellite information from at least two different satellites, a reference database for storing reference locations for each WLAN AP, and logic contained in the positioning module for calculating a distance between each reference WLAN AP location and the possible SPS location solutions and if the distance between the reference WLAN AP location and the SPS location solutions is far, determining that the reference WLAN AP location is incorrect.

In some embodiments, the possible SPS location solutions of the device can include a region of possible location solutions for the device.

In some embodiments, the reference WLAN AP location is far from the SPS locations solutions if the distance is an order of magnitude above the coverage area of the AP.

In some embodiments, the logic can be configured to measure a consistency between the satellite measurements and the WLAN AP reference location.

In some embodiments, the WLAN AP reference location consistency with the satellite information can be measured by applying each of the WLAN AP reference locations to the satellite measurements and calculating an internal SPS receiver clock bias for each WLAN AP reference location.

In some embodiments, a consistency of the internal SPS receiver clock bias for each of the WLAN AP locations can be used as an indication of distance between the WLAN AP location and the possible SPS location solutions of the device.

In some embodiments, calculating the consistency of the internal SPS receiver clock bias for each WLAN AP reference location can include calculating the standard deviation or the mean square error of the internal SPS receiver clock bias.

BRIEF DESCRIPTION OF THE SEVERAL VIEWS OF THE DRAWINGS

For a more complete understanding of various embodiments of the present invention, reference is now made to the following descriptions taken in connection with the accompanying drawings in which.

DETAILED DESCRIPTION

Figure 1:
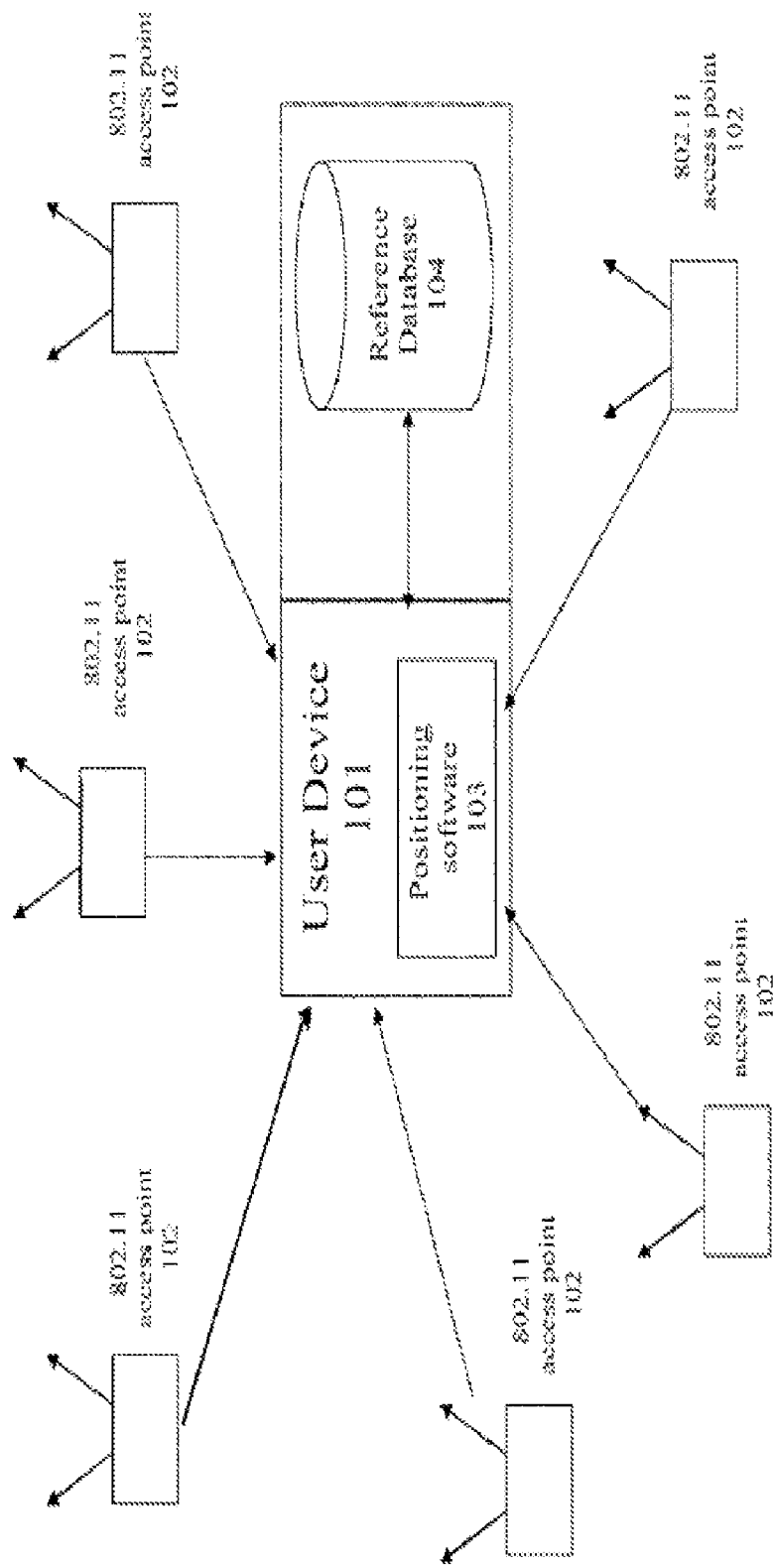
FIG. 1 illustrates a high-level architecture of a WLAN positing system.

Embodiments of the disclosure provide systems and methods for detecting moved WLAN access points in an integrated or hybrid system of WLAN-based positioning system (WLAN-PS) and satellite-based positioning system (SPS) by using received signals from two or more satellites. The WLAN-based positioning system relies on knowing the location of WLAN access points and using them as reference points to estimate a location of a mobile device. The mobile device is equipped with both a satellite receiver and a WLAN receiver for receiving signals from satellite and WLAN access points (APs), respectively. If a WLAN access point moves and the WLAN-based positioning system still uses the old location of the WLAN access point as the reference location, then the WLAN-PS will report a location corresponding to the old location of the WLAN access point, which might be far from its current location. In an integrated system of a WLAN-based positioning system and a satellite-based positioning system, moved WLAN access points are detected by using an SPS position estimate or by using two or more satellites with no SPS position estimate. In situations where it has been determined that one or more WLAN APs have moved from the location logged in the WLAN-PS database, the new AP location can be determined and the WLAN-PS AP position database can be updated accordingly.

In the case that an SPS location estimate does not exist, but measurements from two satellites are acquired, the first step to detect WLAN AP movement can be to consider the location of the WLAN AP as an initial location estimate of the mobile device. The location of the WLAN AP can be determined by accessing the known or reference location of the WLAN AP in a reference database. The reference database contains reference locations of a plurality of WLAN APs. These locations may have been determined through numerous methods including performing a site survey of the coverage area, logging location of WLAN APs at the time of installation, or estimating the location of WLAN APs from received signal strength (RSS) at some known locations in the coverage area. WLAN APs are uniquely identified using their MAC (medium access control) address which is uniquely assigned to each WLAN AP by the manufacturer.

Then, the clock bias of a SPS receiver in the mobile device can be determined based on the measurements from all the acquired satellites in view of the mobile device and the location of the AP. Because the measurements from all the acquired satellites are made at substantially the same time, the same clock bias at the receiver of SPS can be used for all the measurements. If it is assumed that N number of satellites are acquired and satellite parameters are as follows:

Pseudo-range: P
Ionospheric delay: I
Tropospheric delay: T
Location of satellite Xs, Ys, and Zs
and WLAN AP location is shown as X, Y, and Z
the clock bias of SPS receiver is found as follows:

$$C_i = P_i - \sqrt{(Xs_i-X)^2+(Ys_i-Y)^2+(Zs_i-Z)^2} - I_i - T_i; 0 < i \leq N$$

Therefore, if the AP location is the exact location of the mobile device and that location is applied to the above satellite measurements, the exact same clock bias will be found from all the N satellite equations. Thus, the consistency between the calculated clock biases based on each satellite measurement can be used as an indication of a discrepancy or distance between the WLAN-PS initial location (WLAN AP location in this example) and the satellite measurements (which indicate the actual location of the mobile device). If the inconsistency between the clock bias numbers found from the SPS equations for each satellite after applying the WLAN AP location is large, it is concluded that the WLAN AP has moved. In some cases, the new location of WLAN AP may not be able to be determined if there is no estimate for the location of the mobile device. Any statistical method to measure the spread of clock bias measurements can be used here. For example, the spread can be measured by finding standard deviation of clock bias values or mean square error (MSE) as follows:

$$\overline{C} = \frac{\sum_{i=1}^{N} C_i}{N}$$

$$MSE = \frac{\sum_{i=1}^{N} (C_i - \overline{C})^2}{N}$$

An example of large inconsistency or a far distance can be in the order of hundreds of meters in case of standard deviation or if the distance is an order of magnitude larger than the coverage area of the WLAN AP. For example, if the coverage area of the WLAN AP is 100 meters, a far distance would be on the order of 1,000 meters. However, if the coverage area of the WLAN AP is 10 meters, a large distance would be 100 meters. Therefore, the determination of whether or not a distance is far depends on the coverage area of the access points being used for the location determination.

When a SPS location estimate is available, the difference between the location of WLAN APs and the SPS location estimate can be used to detect WLAN AP movement or confirm the general location of detected WLAN APs by the mobile device.

If the difference between location of a WLAN AP and SPS location estimate is large (WLAN AP reference location and SPS location estimate are far from each other), i.e., an order of magnitude higher than expected coverage of the WLAN AP, it can be concluded that the WLAN AP has moved. The coverage of the WLAN AP might be known, for example, by surveying the area. If the coverage of a WLAN AP is not known, a nominal coverage can be considered. A nominal or typical coverage area of a WLAN AP can be found statistically by measuring the coverage areas for many (e.g. thousands) of WLAN APs. Nominal coverage areas can be defined as a sphere with the WLAN AP as the center of the sphere, having a radius between 100 m and 250 m.

If WLAN AP movement is detected, the new location in which the WLAN AP was detected can be used to correct and update the location of the WLAN AP in the reference database.

This process of detecting WLAN AP movement can be applied to every detected WLAN AP.

Figure 3:
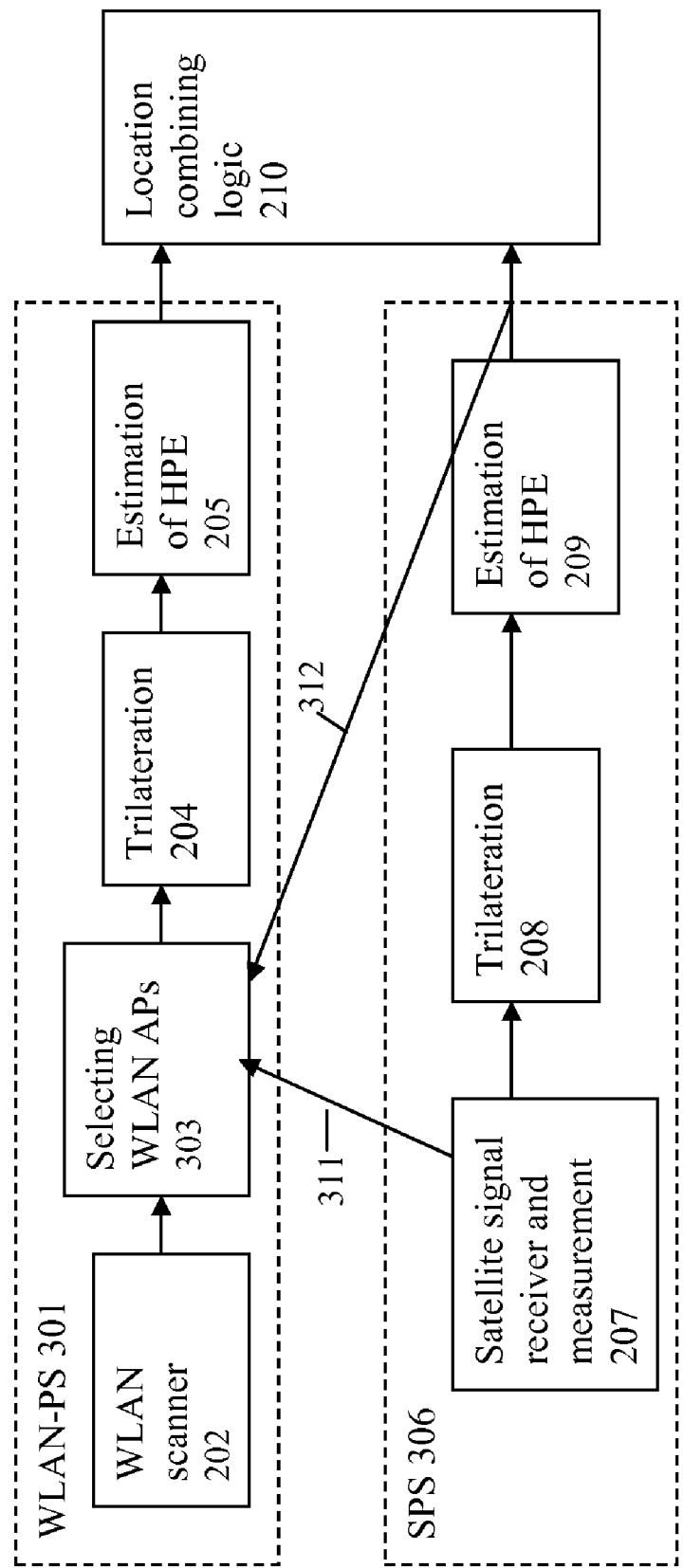
FIG. 3 illustrates a system of integrated WLAN-PS and SPS system, in which the WLAN-PS detects WLAN access point (AP) movement by using SPS information, according to one or more embodiments of the disclosed subject matter.

FIG. 3 illustrates a block diagram of the hybrid system of a WLAN-PS 301 and a SPS 306, in which an SPS location estimate 312 and also raw SPS measurements 311 can be provided to the WLAN-PS to detect AP movement.

Figure 2:
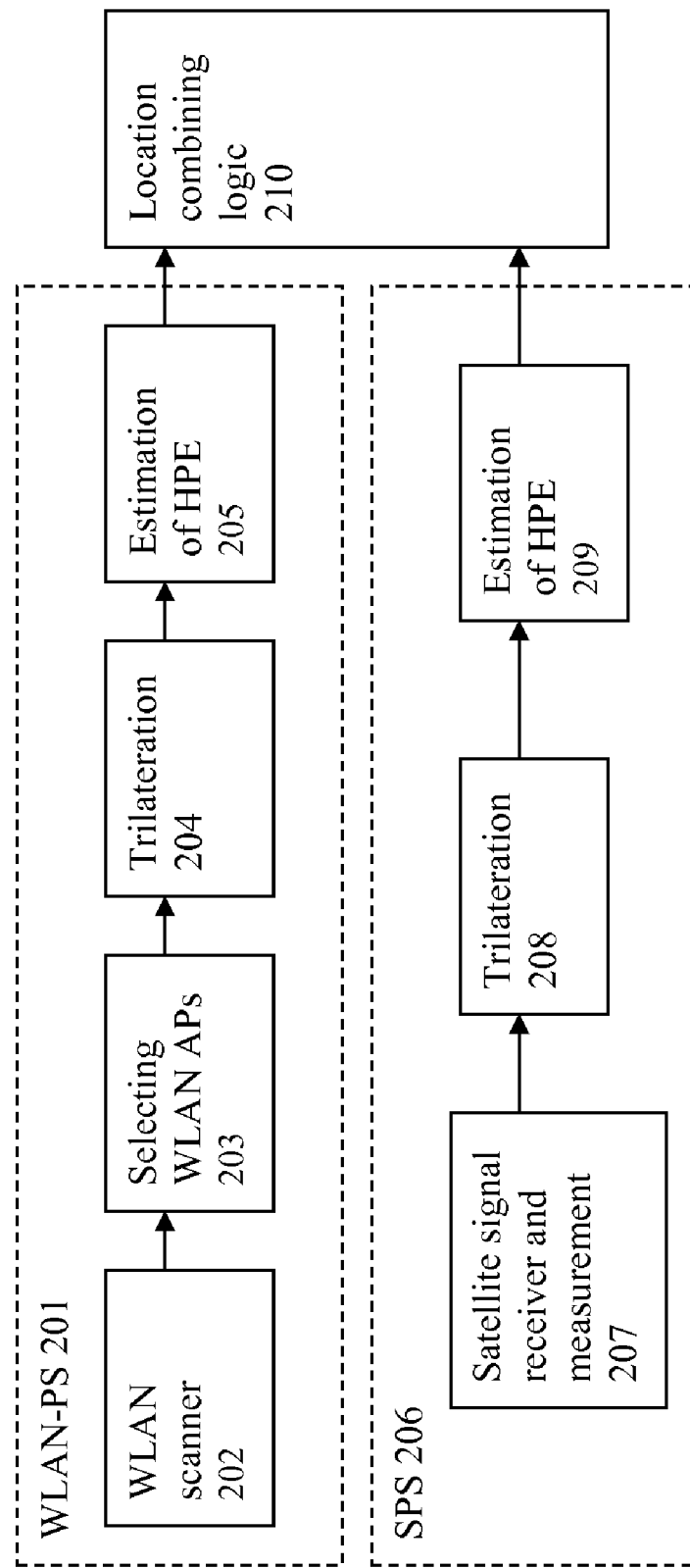
FIG. 2 illustrates a system for a conventional way of integrating WLAN-PS and SPS.

The SPS 306 is an off-the-shelf, conventional satellite positioning device which consists of the same devices as SPS 206 in FIG. 2, with the addition of the raw measurement output 311 and the SPS location estimate output 312. The satellite receiver and measurement device 207 is a component of every conventional SPS receiver 306, and raw SPS measurements are an essential part of the SPS measurement. However, here the raw SPS measurements are used outside the SPS 306, as is shown by SPS measurement output 311. Not all the commercial SPS receivers expose the raw SPS measurements to devices outside SPS 306. For example, Star III GPS manufactured by SiRF Technology, Inc. (San Jose, Calif.), provides raw SPS measurements as part of its standard interface. However, there are some other GPS receivers that do not provide such measurements. For the SPS receivers that do not expose raw SPS measurements as part of their standard interface, the SPS receiver 306 can be modified to permit access to the raw SPS measurements.

The WLAN-PS 301 functions in a similar manner as the WLAN-PS 201 shown in FIG. 2 except that WLAN AP selection device 303 is configured to receive raw SPS measurements 311 and an SPS location estimate 312 when they are available. The integration of the raw SPS measurement 311 and the SPS location estimate 312 with WLAN-PS 301 changes the design of WLAN APs selection device 303. The WLAN-PS 301 can take advantage of the raw SPS measurements when at least two satellites are acquired even without any fix or solution from the SPS 306.

WLAN APs selection device 303 receives the SPS location estimate 312 or raw SPS measurements 311, if they are available, and measures the distance between the location of each WLAN AP and the SPS location estimate or possible satellite locations solutions derived from raw SPS measurements. WLAN APs, which are not consistent with SPS location estimate or solutions, are declared as moved and removed from the list of APs to locate the mobile device. The WLAN APs, which are detected as moved by WLAN AP selection device 303, are flagged and logged as being moved to a new location in the reference database.

Figure 4A:
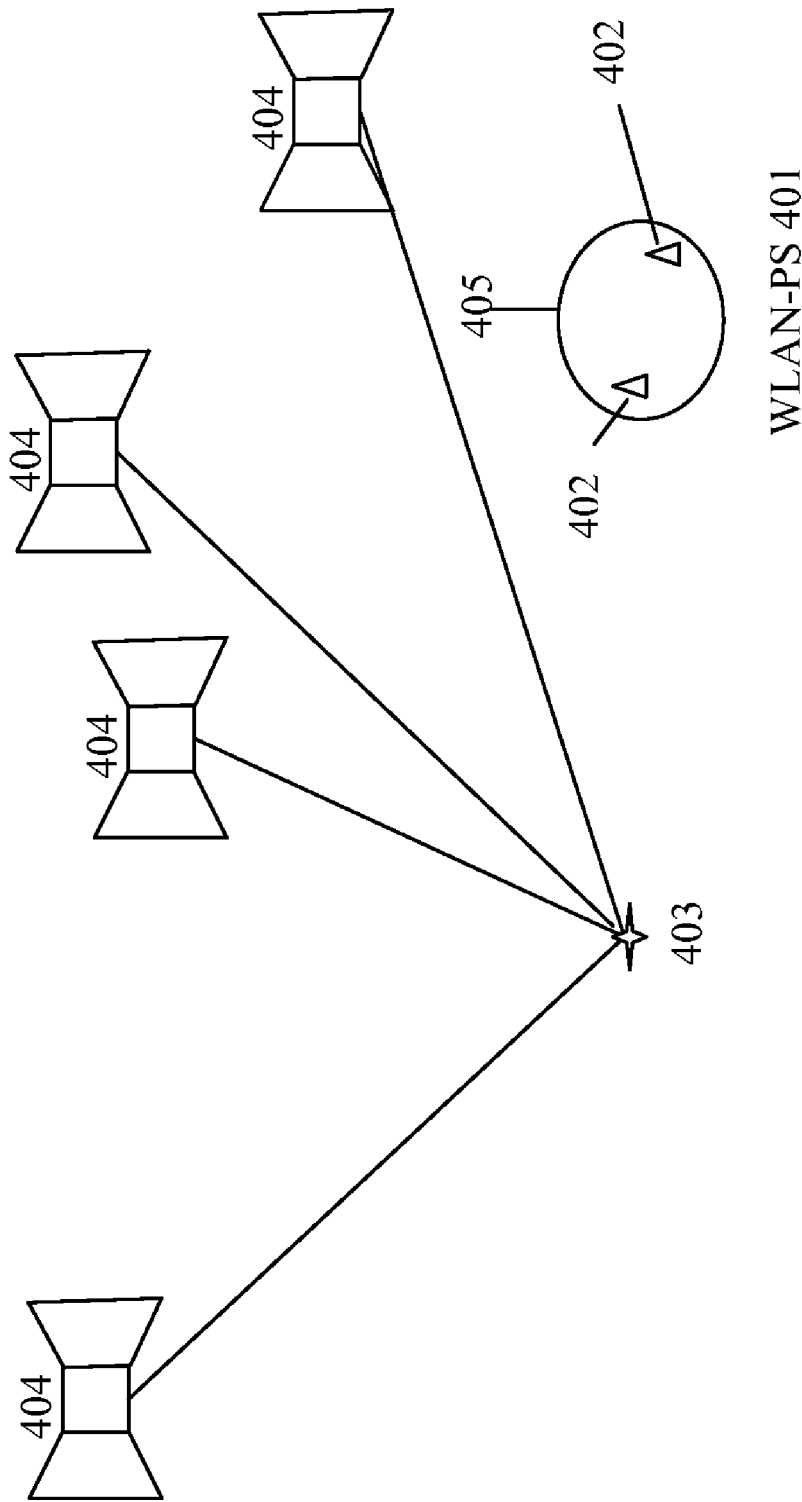
FIG. 4A illustrates the use of an integrated WLAN-PS and SPS system to detect WLAN access point (AP) movement, according to one or more embodiments of the disclosed subject matter.

FIG. 4A illustrates an integrated WLAN-PS 401 and SPS positioning system 406. The WLAN-PS 401 uses WLAN APs 402 to estimate the location of the mobile device and the expected error in that location estimation 405. The expected error of the location estimate refers to the general geographical region 405. However, in this example, the SPS 406 uses acquired satellites 404 to report a location 403 which is far from the 405 region. Therefore, it is concluded that the WLAN APs 402 were moved to a new area close to the location 403 reported by SPS 406.

Figure 4B:
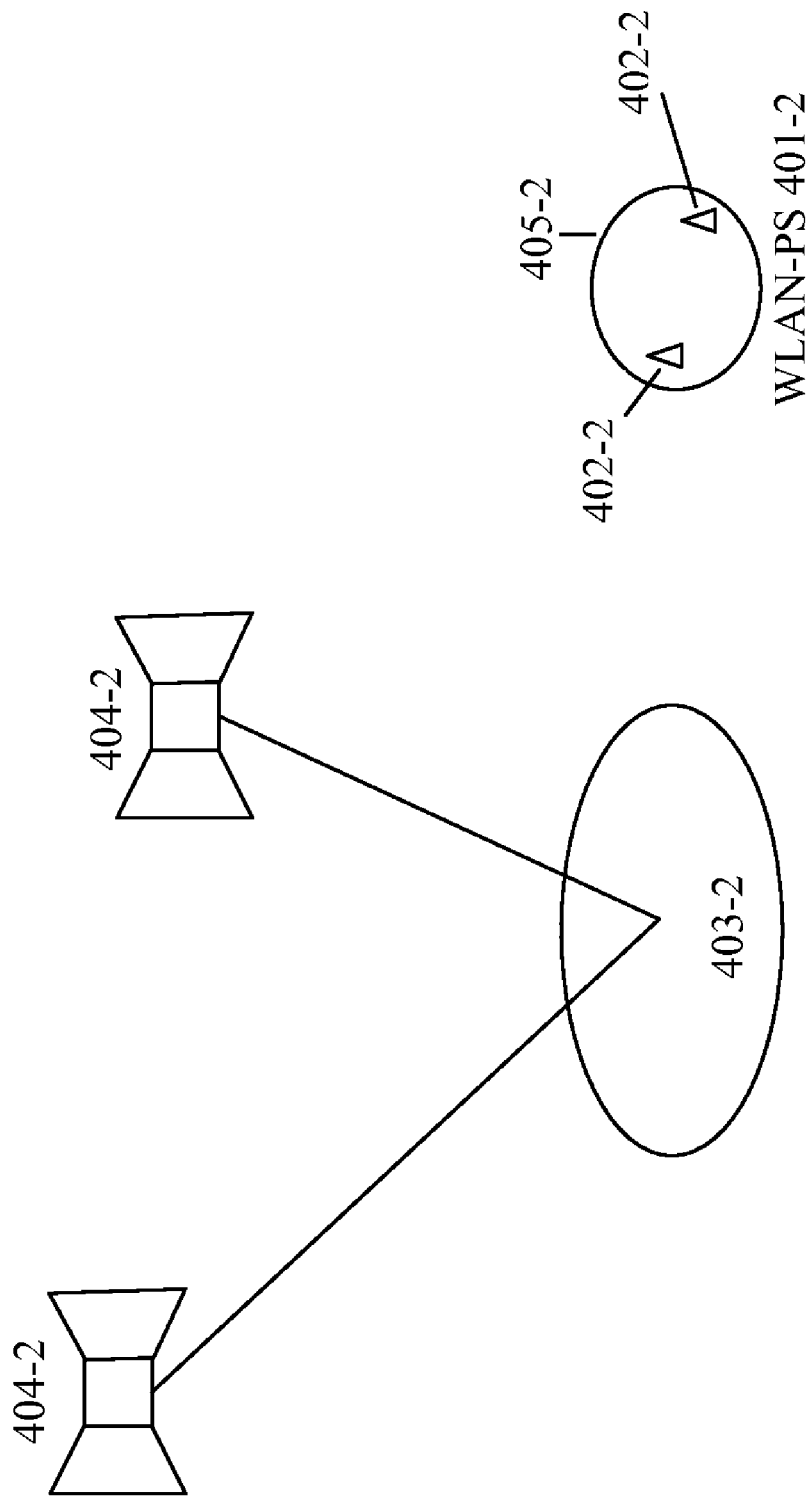
FIG. 4B illustrates the use of an integrated WLAN-PS and SPS system to detect WLAN access point (AP) movement, according to one or more embodiments of the disclosed subject matter.

FIG. 4B illustrates an integrated WLAN-PS 401-2 and SPS 406-2, when measurements from satellites 404-2 do not result in a location estimate of the mobile device, but at least two satellites 404-2 are acquired. The WLAN-PS 401-2 uses WLAN APs 402-2 to estimate the location of the mobile device. Considering the expected error of the location estimate of the WLAN-PS, there will be a general geographical region 405-2 of the WLAN-PS location estimate. Acquired satellites 404-2 refer to a set of possible locations for the mobile device 403-2. If the WLAN-PS general area 405-2 is far from the SPS possible location estimates for the mobile device 403-2, it is concluded that the WLAN APs 402-2 were moved to the new area close to the general area reported by SPS 403-2.

Another embodiment provides a method and system to integrate WLAN-PS and SPS by selecting the best set of raw measurements between both systems and/or rejecting low quality measurements from either system after considering estimates from both systems. Measurements can refer to the aggregate of WLAN-PS and SPS measurements. Considering the aggregated set of WLAN and SPS measurements, the first step is to determine whether the measurements from WLAN APs and the satellite measurements form more than one cluster.

Each cluster of only satellite measurements includes of a minimum of three satellites. In the case of less than four satellite measurements in a cluster, a cluster of satellite measurements can result in a set of possible location estimates for the mobile device in the form of a region or an area of possible location estimates. In the case of four or more than four satellite measurements in a cluster, a cluster of satellite measurements can result in a location estimate for the mobile device. A cluster is defined as a set of measurements which point to a small geographical area as a potential location for the mobile device. A small geographical area is defined based on nominal coverage of WLAN APs, and can be on the order of a couple of ten meters. In the case of satellite measurements, two satellites do not form a cluster. If we consider only two satellite measurements, satellite equations are going to be as follows:

$$r_{s1} = r_1 + b$$

$$r_{s2} = r_2 + b$$

In which $r_s$ is the pseudorange measurement, r is the actual distance from satellite, and b is the clock bias of SPS receiver. The index one and two are used for a first satellite and a second satellite. As it is seen in the above equations, there are three unknowns and two equations. Therefore, there is a set of solutions, or for any value of the clock bias of the SPS receiver there is a solution for $r_1$ and $r_2$. In the case of two satellites, the consistency between the measurements cannot be calculated. Therefore, there is no cluster of only two satellites. However, if a location estimate from WLAN-PS is also considered, the exact distance of satellites to the estimated location of WLAN-PS can be calculated ($r_1$ and $r_2$), and the value of b can be found from both equations. If the estimated location by WLAN-PS is correct, the satellite measurements are correct, and the estimated location is the exact location of the mobile device; the calculated b from both equations should be exactly the same. Otherwise, they are different, and the difference between calculated b values from two equations is an indication of the distance between the estimated locations of the WLAN-PS and the satellite measurements. In other words, in the case that a cluster consists of two satellites and a location estimate from WLAN-PS, the difference between b values is an indication of consistency of the measurements.

In the case of three or more satellites, the consistency between satellite measurements can be calculated. For example, the equations are going to be as follows for three satellites measurements $$r_{s1} = r_1 + b$$

$$r_{s2} = r_2 + b$$

$$r_{s3} = r_3 + b$$

Assuming any value for clock bias of SPS receiver, b, results in solutions for $r_1$, $r_2$, and $r_3$, which are the distances between three satellites, the end solution is the intersection of three spheres. Ideally, the three spheres intersect at one point, but if they do not, the distance between intersections is an indication of consistency between satellite measurements. The measurements which are consistent are considered as a cluster.

If the measurements from the WLAN-PS and SPS form more than one cluster, the clusters can be identified and the quality of each cluster can be determined. Then, the cluster with the best quality metric can be selected to be used to calculate the location of the mobile device. There are known methods to measure the quality of the SPS measurements, for example, Dilution of Precision (see Global Positioning System: Signals, Measurements and Performance by Pratap Misra and Per Enge (2006), the entire disclosure of which is herein incorporated by reference.). The quality of clusters can be calculated based on number of WLAN APs in each cluster, the quality of measurements from the WLAN APs, the number of satellites, the consistency between satellite measurements and WLAN APs estimated location, and the quality of satellite measurements.

In various embodiments, the quality metric can be an aggregate of a number WLAN APs and satellite measurements in a cluster, it can be the number of WLAN APs in the cluster with at least two satellites, or it can be the WLAN-PS location estimate, which is then used to reject low quality satellite measurements when more than four satellites are acquired. In this last embodiment, the best set of four satellites can then be used to locate the mobile device. In another example, after collecting measurements from satellites and WLAN APs, in the first step only WLAN APs are considered for clustering. Then all the satellite measurements are checked against the location estimate from each cluster of WLAN APs. From the satellite measurements, a subset is added to the associated measurements of each cluster, which is consistent with the WLAN APs reported location.

Figure 5:
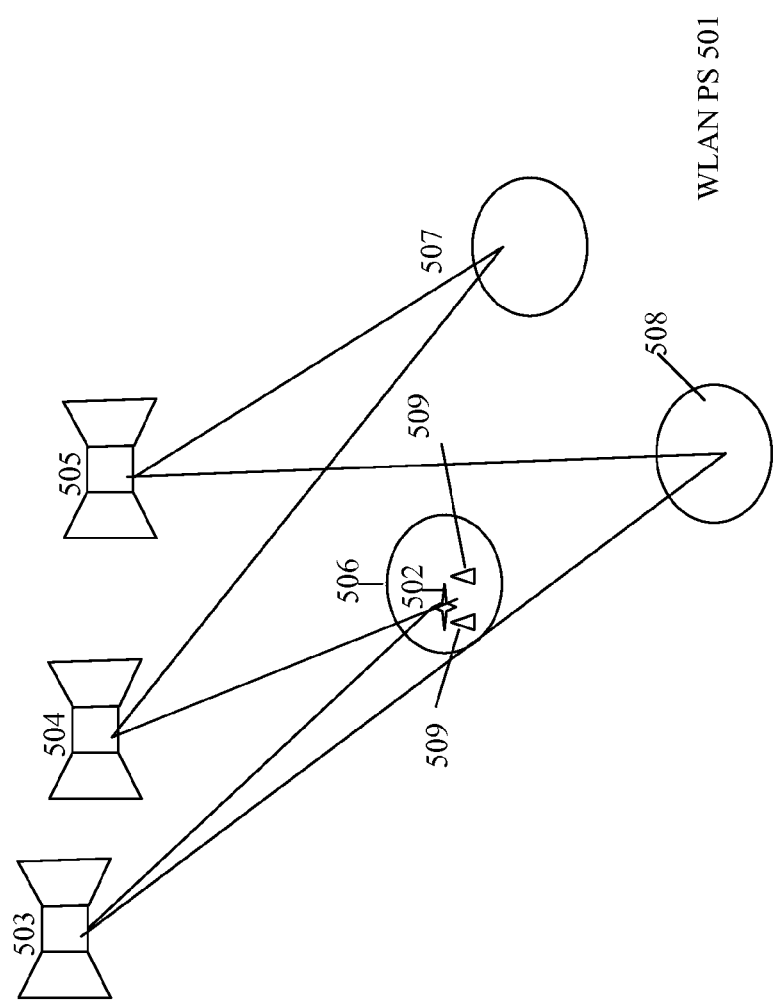
FIG. 5 illustrates a system for selecting the best set of measurements from the collective measurements from satellites and WLAN APs, according to one or more embodiments of the disclosed subject matter.

The last step is selecting a cluster with the best quality in order to estimate the location of the mobile device. The measurements in this cluster can be used to estimate the location of the mobile device. An example is shown in FIG. 5, in which signals from three satellites 503, 504, 505 and WLAN APs 509 were acquired. WLAN-PS 501 results to a location estimate 502. In this example, the WLAN APs 509 are close to each other and form only one cluster, and three satellite 503, 504, 505 measurements can be considered two at the time and in this case there are three different sets of solutions 506, 507, 508. However, only one of satellite solutions 506 includes the WLAN-PS location estimate 502. Therefore, the two satellites 503, 504 and the WLAN APs are considered to estimate the location of the mobile device.

Another embodiment provides a method and system to select the best set of SPS satellite measurements using the WLAN-PS results. If the number of acquired satellites is more than the minimum of four satellites required to calculate the location of the mobile device, the SPS can select the best set of satellite measurements based on the satellite measurements' consistency with the WLAN-PS estimate location. The SPS signal is subject to multipath in an indoor or urban environment, which can cause large error in measurements for some satellites. Therefore, the WLAN-PS estimation can be used as an initial estimate of the mobile device location and can be used as another criterion to accept or reject satellite measurements based on distance between the SPS location estimate and the WLAN-PS estimated location. Therefore, the WLAN-PS estimated location and expected error also are two additional parameters which can be used to select the best set of satellite measurements to estimate the location of the mobile device using SPS.

A satellite measurement can be considered to be consistent with a WLAN based location estimate if the distance between location estimate from the set of satellite measurement and location estimate from WLAN APs is less than the expected error of WLAN-PS or SPS. The expected error of the WLAN-PS can be, for example, 10 to 500 meters and the expected error of the SPS can be, for example, 1 to 500 meters. The nominal WLAN-PS error can be, 30 to 40 meters, and the nominal error can be, for example, 5 to 10 meters. In some embodiments, the distance between the WLAN based location estimate and the location estimate result from the set of satellite measurements can be measured to provide a measurement of the consistency of the satellite measurements and the WLAN based position estimate. For example, if the distance between the location estimate result from the set of satellite measurement and the WLAN based location estimate is far, for example, on the order of one hundred meters, that satellite measurement can be considered to be inconsistent with the WLAN based position estimate. Therefore, that satellite measure can be eliminated from the position estimation calculation. If the distance between the location estimate result from the set of satellite measurements and the WLAN based position estimate is small, for example, on the order of ten meters, those satellite measurements can be determined to be consistent with the WLAN based position estimate and those satellite measurements can be used to estimate location of the mobile device.

Figure 6:
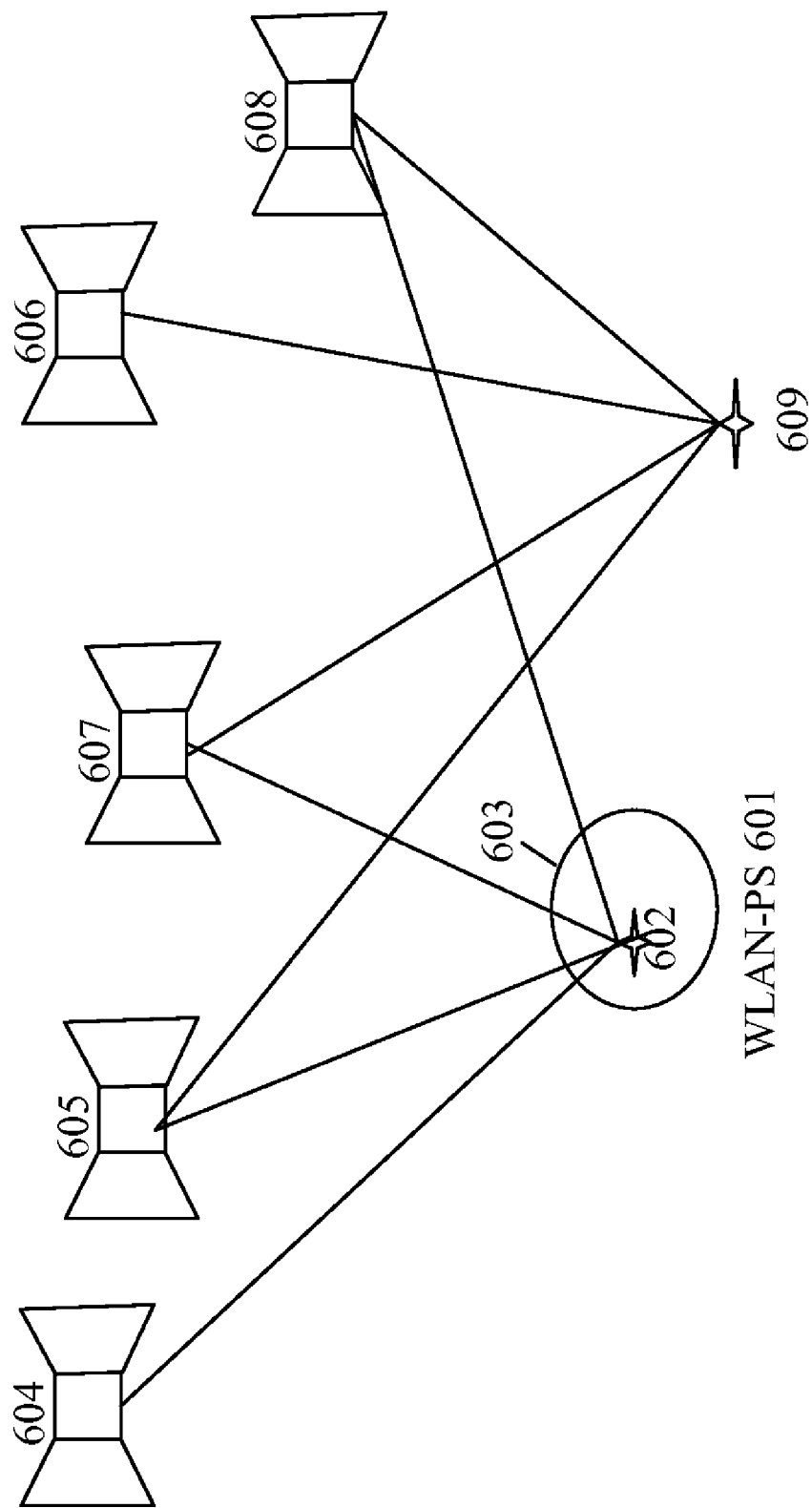
FIG. 6 illustrates a system for selecting the best set of satellite measurements by using WLAN-PS, according to one or more embodiments of the disclosed subject matter.

FIG. 6 illustrates an integrated WLAN-PS and SPS system, in which SPS has acquired five satellites 604, 605, 606, 607, and 608. It is shown that using satellites 604, 605, 607 and 608 (a first cluster of satellites) results in location estimate 602, which is different than location estimate 609, which was a result of using satellites 605, 606, 607 and 608 (a second cluster of satellites). Because WLAN-PS 601 estimated location area 603 is consistent with estimated location 602 and not 609, the final location estimate of the mobile device is reported as 602, which is consistent with the first cluster of satellites. Further, because satellite 606 was the only satellite that indicated the incorrect position, it can be identified as an erroneous satellite measurement.

Figure 7:
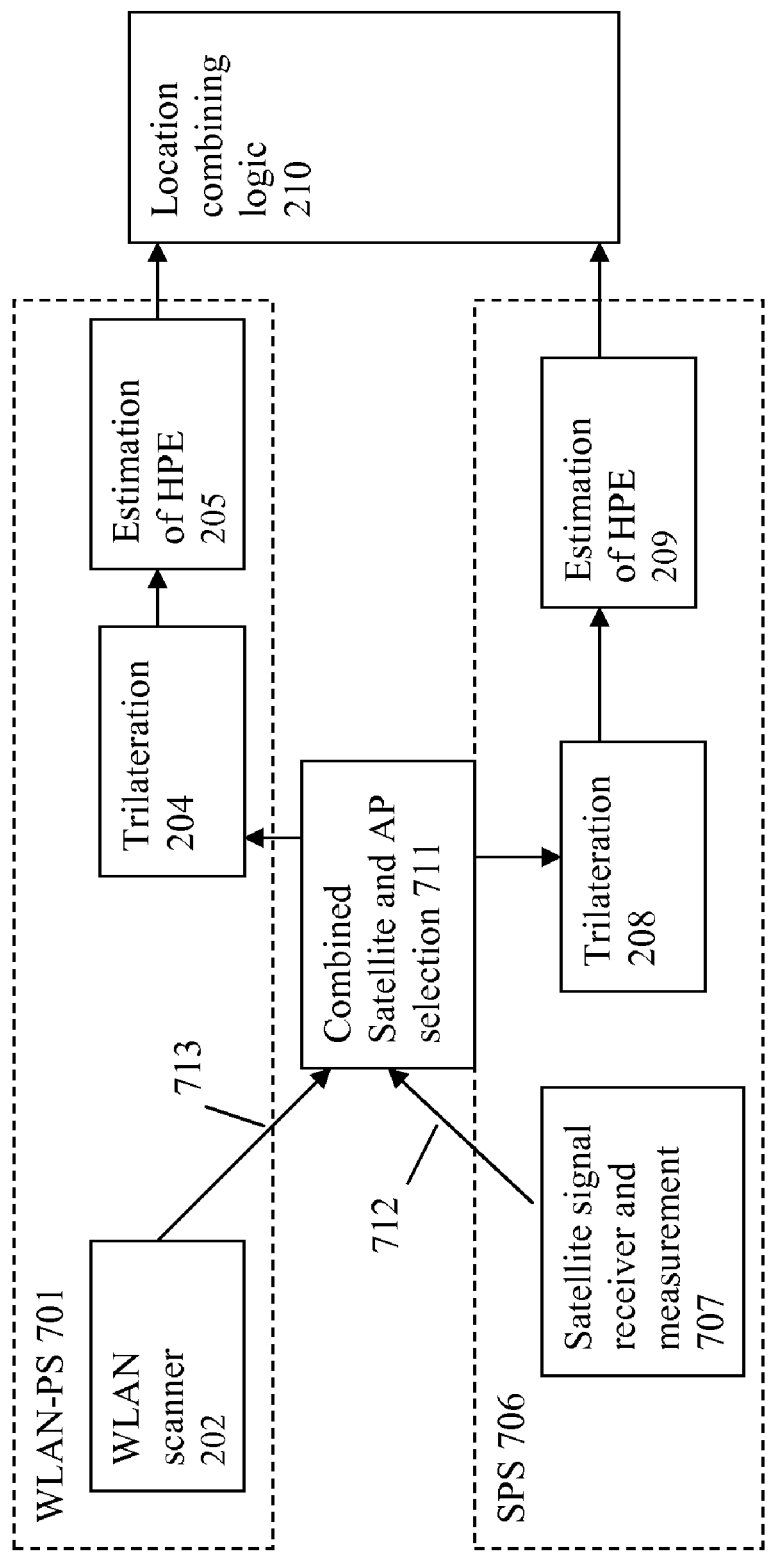
FIG. 7 illustrates an integrated WLAN-PS and SPS system, in which WLAN APs and SPS measurements are combined and the best set of measurements between both systems are selected to estimate location of the mobile device, according to one or more embodiments of the disclosed subject matter.

FIG. 7 illustrates an integrated WLAN-PS and SPS system, in which raw SPS measurements and WLAN APs are selected in an integrated fashion.

SPS 706 includes the same modules as conventional systems, except that raw SPS measurements from all the satellites 712 are output to a new module, combined satellite and AP selection device 711, which selects the best set of raw SPS measurements and the combined satellite and AP selection device 711 returns the selected set of raw SPS measurements for position estimation calculation back to trilateration device 208 in the SPS 706. Off-the-shelf SPS receivers 306 usually do not provide mechanisms to select raw SPS measurements outside the module. Therefore, the SPS receiver should be modified to accommodate these requirements.

WLAN-PS 701 consists of all the conventional modules, except selection of WLAN APs. WLAN AP selection logic is modified and it is incorporated with raw SPS measurement 712 in combined satellite and AP selection device 711, which is shown outside WLAN-PS 701 and SPS 706.

The combined satellite and AP selection device 711 receives a list of detected WLAN APs 713, and raw SPS measurements 712 and applies logic to select the best set of raw SPS measurements and WLAN APs based on aggregate information provided by both systems. Logic can be a set of computer readable instructions or software, stored on a computer readable medium. The computer readable medium can be located in any of the devices, modules or systems disclosed herein. Moreover, the logic processing could be controlled by a software program on one or more computer systems or processors, or could even be partially or wholly implemented in hardware.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present disclosure; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description provided above.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object-oriented and/or interpretive environment such as Java and transported to multiple destinations to various users.

It is to be understood that the invention is not limited in its application to the details of construction and to the arrangements of the components set forth in the foregoing description or illustrated in the drawings. Accordingly, it will be understood that the invention is capable of other embodiments and of being practiced and carried out in various ways. Also, it is to be understood that the phraseology and terminology employed herein are for the purpose of description and should not be regarded as limiting.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The many features and advantages of the embodiments of the present invention are apparent from the detail specification, and thus, it is intended to cover all such features and advantages of the invention that fall within the true spirit and scope of the invention. All suitable modifications and equivalents maybe resorted to, falling within the scope of the invention.

What is claimed is:

1. A method of using a Wireless Local Area Network (WLAN) and satellite enabled device to infer that a reference location associated with a detected WLAN access point (AP) is not the present location of the AP, the method comprising:
identifying WLAN APs detected by the WLAN and satellite enabled device;
accessing a reference database to obtain a reference location associated with at least one of the WLAN APs;
receiving at least one possible Satellite Positioning System (SPS) location solution of the device based on satellite measurements from at least two satellites;
estimating a distance between the reference location associated with the WLAN AP and the at least one possible SPS location solution; and
inferring that the reference location associated with the WLAN AP is not the present location of the WLAN AP if the distance between the reference location associated with the WLAN AP and the at least one SPS location solution is above a predetermined threshold.

2. The method of claim 1, wherein the satellite measurements are from less than four satellites.

3. The method of claim 1, further comprising providing a plurality of possible SPS location solutions of the device from the satellite measurements.

4. The method of claim 3, wherein the plurality of possible SPS location solutions of the device comprise a region of possible location solutions for the device.

5. The method of claim 1, further comprising indicating in the reference database that the reference location associated with the WLAN AP is not the present location of the WLAN AP.

6. The method of claim 1, further comprising updating the reference location associated with the WLAN AP in the reference database to reflect an estimated present location of the associated WLAN AP.

7. The method of claim 1, wherein the predetermined threshold is based on an estimated coverage area of the WLAN AP.

8. The method of claim 1, further comprising estimating a consistency between the satellite measurements and the reference location associated with the WLAN AP.

9. The method of claim 8, wherein the consistency between the reference location associated with the WLAN AP and the satellite measurements is estimated by applying the reference location associated with the WLAN AP to the satellite measurements and determining an internal SPS receiver clock bias to conform the satellite measurements to the reference location associated with the WLAN AP.

10. The method of claim 8, further comprising calculating an internal SPS receiver clock bias by considering the reference location associated with the WLAN AP as an initial position.

11. The method of claim 1, wherein the estimating the distance between the reference location associated with the WLAN AP and the at least one possible SPS location solution is estimated based on:
  determining an internal SPS receiver clock bias that would yield an SPS position within a predetermined distance of the reference location associated with the WLAN AP; and
  comparing the determined internal SPS receiver clock bias to a clock bias associated with the at least one possible SPS location solution.

12. The method of claim 11, wherein determining the internal SPS receiver clock bias that would yield an SPS position within a predetermined distance of the reference location associated with the WLAN AP includes determining the standard deviation or the mean square error of the internal SPS receiver clock bias.

13. A system for using a Wireless Local Area Network (WLAN) and satellite enabled device to infer that a reference location associated with a detected WLAN access point (AP) is not the present location of the AP, the system comprising:
  logic for identifying WLAN APs detected by the WLAN and satellite enabled device;
  logic for accessing a reference database to obtain a reference location associated with at least one of the WLAN APs;
  logic for receiving at least one possible Satellite Positioning System (SPS) location solution of the device based on satellite measurements from at least two satellites;
  logic for estimating a distance between the reference location associated with the WLAN AP and the at least one possible SPS location solution; and
  logic for inferring that the reference location associated with the WLAN AP is not the present location of the WLAN AP if the distance between the reference location associated with the WLAN AP and the at least one SPS location solution is above a predetermined threshold.

14. The system of claim 13, wherein the satellite measurements are from less than four satellites.

15. The system of claim 13, the logic for receiving at least one possible SPS location solution including logic for providing a plurality of possible SPS location solutions of the device from the satellite measurements.

16. The system of claim 15, wherein the plurality of possible SPS location solutions of the device comprise a region of possible location solutions for the device.

17. The system of claim 13, further comprising logic for indicating in the reference database that the reference location associated with the WLAN AP is not the present location of the WLAN AP.

18. The system of claim 13, further comprising logic for updating the reference location associated with the WLAN AP in the reference database to reflect an estimated present location of the associated WLAN AP.

19. The system of claim 13, wherein the predetermined threshold is based on an estimated coverage area of the WLAN AP.

20. The system of claim 13, further comprising logic for estimating a consistency between the satellite measurements and the reference location associated with the WLAN AP.

21. The system of claim 20, wherein the consistency between the reference location associated with the WLAN AP and the satellite measurements is estimated by applying the reference location associated with the WLAN AP to the satellite measurements and determining an internal SPS receiver clock bias to conform the satellite measurements to the reference location associated with the WLAN AP.

22. The system of claim 20, further comprising logic for calculating an internal SPS receiver clock bias by considering the reference location associated with the WLAN AP as an initial position.

23. The system of claim 13, wherein the estimating the distance between the reference location associated with the WLAN AP and the at least one possible SPS location solution is estimated based on:
  determining an internal SPS receiver clock bias that would yield an SPS position within a predetermined distance of the reference location associated with the WLAN AP; and
  comparing the determined internal SPS receiver clock bias to a clock bias associated with the at least one possible SPS location solution.

24. The system of claim 23, wherein determining the internal SPS receiver clock bias that would yield an SPS position within a predetermined distance of the reference location associated with the WLAN AP includes determining the standard deviation or the mean square error of the internal SPS receiver clock bias.

* * * * *